June 12, 1951     C. D. AMMON     2,556,512
VARIABLE RATIO DRIVE MECHANISM
Filed March 8, 1949     4 Sheets-Sheet 1
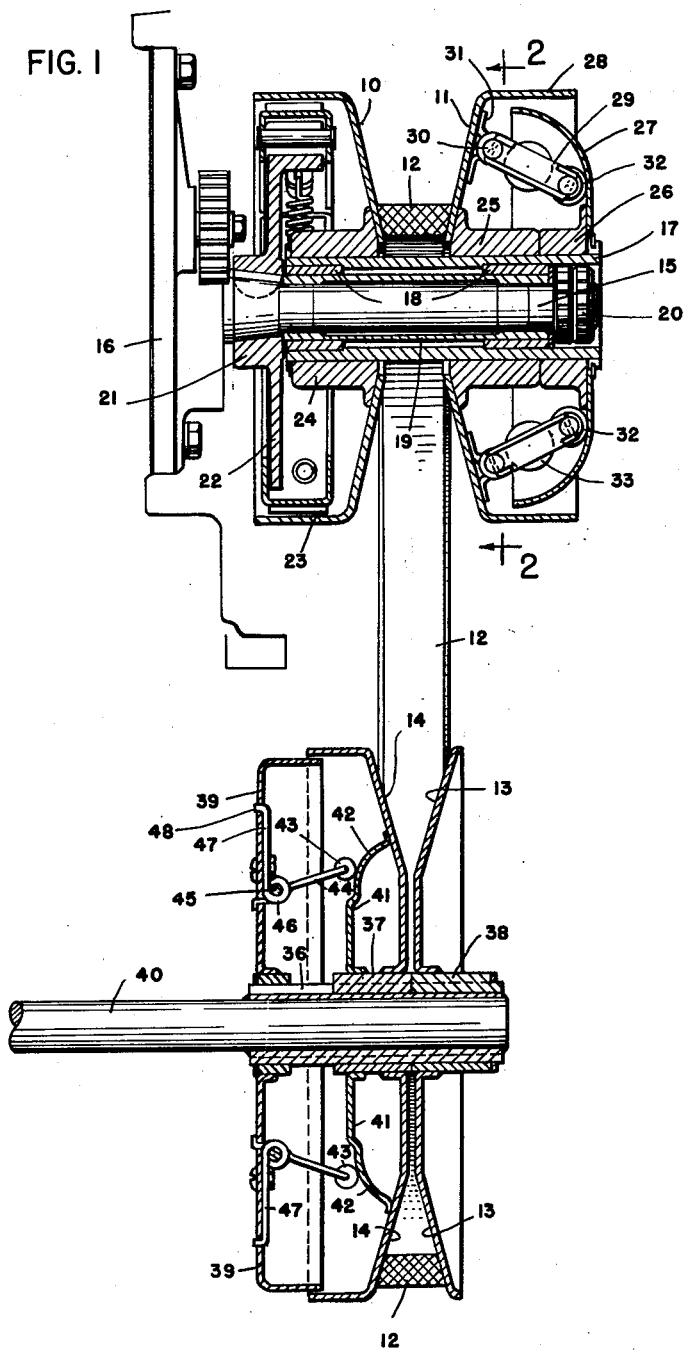
INVENTOR:
CHARLES D. AMMON,
BY
ATT'YS June 12, 1951  C. D. AMMON  2,556,512
VARIABLE RATIO DRIVE MECHANISM
Filed March 8, 1949  4 Sheets-Sheet 2
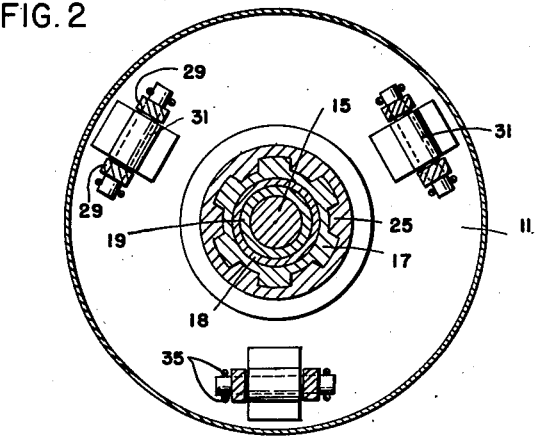
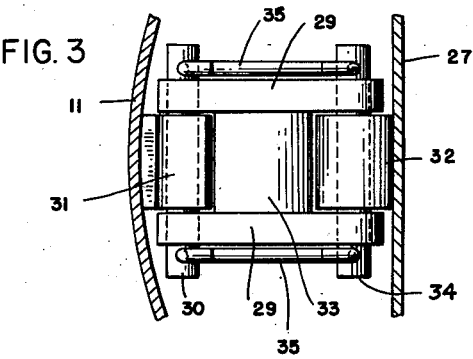
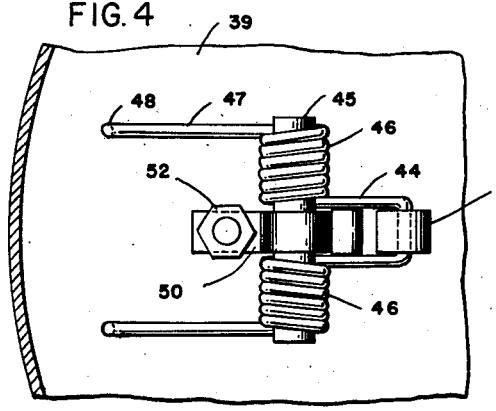
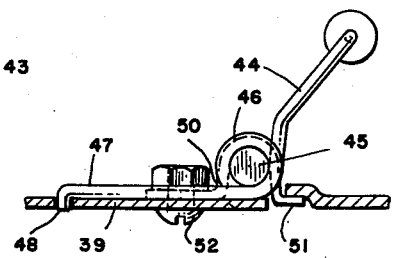
INVENTOR:
CHARLES D. AMMON,
BY
ATT'YS June 12, 1951     C. D. AMMON     2,556,512
VARIABLE RATIO DRIVE MECHANISM
Filed March 8, 1949     4 Sheets-Sheet 3
FIG. 6
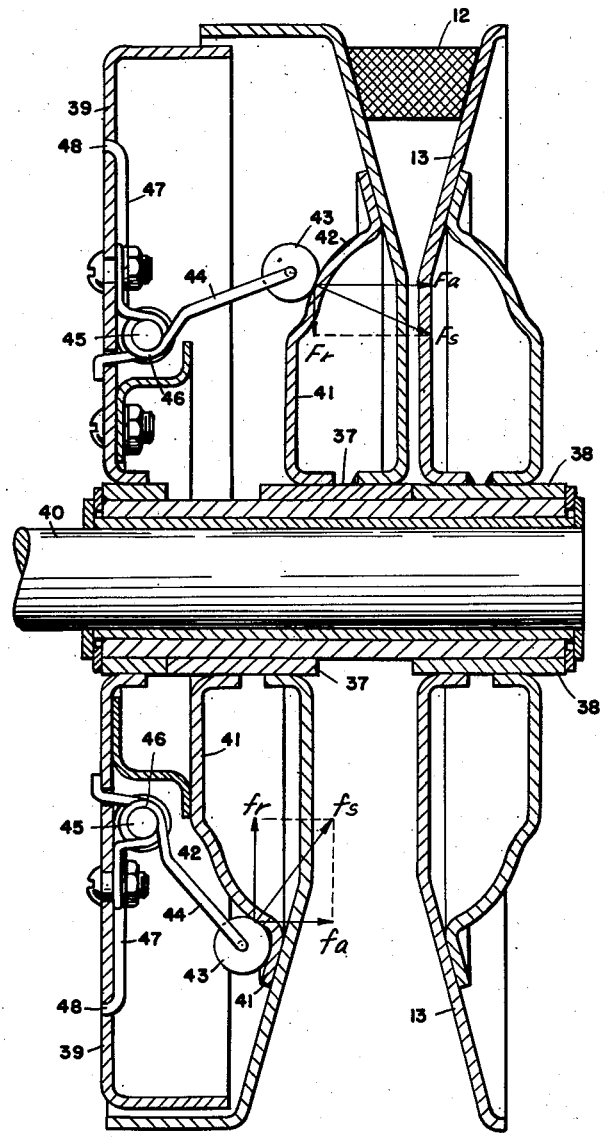
INVENTOR.
CHARLES D. AMMON
BY
ATT'YS June 12, 1951 C. D. AMMON 2,556,512
VARIABLE RATIO DRIVE MECHANISM
Filed March 8, 1949 4 Sheets-Sheet 4

INVENTOR:
CHARLES D. AMMON,
BY
ATT'YS

Patented June 12, 1951

2,556,512

UNITED STATES PATENT OFFICE 2,556,512

VARIABLE RATIO DRIVE MECHANISM

Charles D. Ammon, Lincoln, Nebr., assignor to Cushman Motor Works, Inc., Lincoln, Nebr., a corporation of Nebraska Application March 8, 1949, Serial No. 80,213

3 Claims. (Cl. 74—230.17)

This invention relates to drive mechanism of the V-belt type in which the ratio of the effective diameters of the driving and driven pulleys are automatically varied by axial adjustment of the flanges or side members of each pulley toward and away from each other.

A serious objection to V-belt drives of this general type that is encountered in hereinbefore existing forms is rapid belt wear and loss of power in friction, due to the fact that the mechanisms which control movements of the shiftable pulley flanges is such that the pressure on the sides of the belt increases as the pulleys approach their low speed ratio, whereas a pressure decrease is desirable and proper to meet the requirements of power transmission.

It is a well known fact that for the transmission of a given amount of power by means of a V-belt, more pressure must be exerted against the sides of the belt to prevent slippage at low belt speeds than is necessary at high belt speeds.

The main objects of this present invention are to provide improved automatic means for adjusting the speed ratio of the pulleys in a V-belt drive, whereby the side pressure on the belt will be progressively reduced as the belt speed is increased and the speed ratio between the driving and driven members is reduced; and to provide improved mechanism of this type which normally assumes its high ratio position when inactive and which utilizes the pull of the belt and the action of springs exerting pressure upon a cooperating cam or ramp so as to reduce the side pressure on the belt as the ratio between the driving member and the driven member is decreased.

Specific embodiments of this invention are illustrated in the accompanying drawings, in which:

Figure 1 is a preferred form of variable ratio V-belt drive constructed according to this invention with its driving and driven pulleys shown in section on the plane of the axes thereof.

Fig. 2 is a sectional detail taken on the line 2—2 of Fig. 1.

Fig. 3 is an enlarged detail of the structure and mounting of one of the flyweighted arms that controls the position of the axially movable pulley disk member of the driving pulley.

Fig. 4 is an enlarged detail of the structure and mounting of one of the operating arms that controls the pressure exerted against the sides of the belt by the axially movable disk member of the driven pulley in the form shown in Fig. 1.

Fig. 5 is an elevation of the same as viewed from the bottom of Fig. 4.

Fig. 6 is a sectional view of the driven pulley showing, by diagrams of graphic analysis of forces, how axial pressure exerted against the belt by the driven member is varied, the upper half of the figure showing the parts in the position of maximum effective diameter of the pulley and the lower half showing the parts in the position corresponding to the minimum effective diameter of the pulley.

Figure 7:
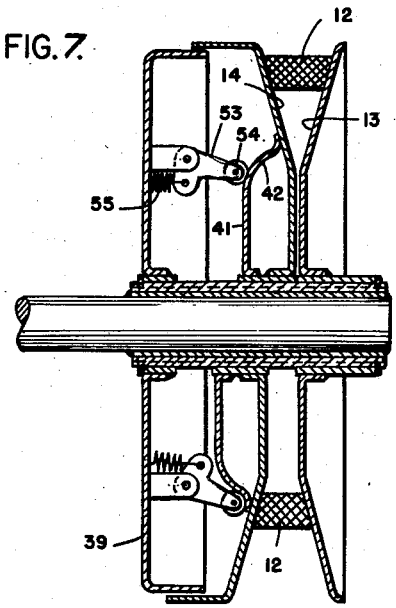
Fig. 7 is a sectional view of the driven pulley with a modified form of the actuating arms, the upper half of the figure showing the parts in the position of maximum effective diameter of the pulley and the lower half showing the parts in the position corresponding to the minimum effective diameter of the pulley.

In the form shown in the drawings, the drive is designed for use in motor driven vehicles and any other powered device in which an automatically variable speed ratio between driving and driven members is desirable. In heretofore existing drives of this kind, there is continually increasing pressure exerted by the pulleys against the sides of the belt as the ratio between the driving and driven members is decreased. This is exactly the opposite of what is needed. When the mechanism is starting in high ratio, that is, with the driving pulley small and the driven pulley large, the belt speed is low, making it necessary to exert more pressure against the sides of the belt in order to keep it from slipping than when the variable ratio drive has shifted into low ratio, with the driving pulley increasing in effective diameter, thus producing a much greater belt speed, and the driven pulley decreasing in effective diameter. Unless the pressure against the sides of the belt is reduced as the transmissions shifts into low ratio, serious wear on the belt, pulleys and associated bearings result, and there is considerable power loss and heating due to excessive and unnecessary friction between the belt and the pulley members.

In the form shown in Figure 1, the driving pulley comprises three members in the form of annular flanges on the driving shaft, including a fixed member 10 and an axially shiftable member 11 having opposed conical faces for engagement with a V-belt 12; and the driven pulley also comprises three such members including a fixed member 13 and an axially shiftable member 14 with opposed conical faces for engagement with the tapered sides of the belt 12. These pulleys have their operating mechanisms arranged for automatically changing their respective effective diameters to attain a variation of the speed ratio of the two pulleys. The pulleys have their shiftable members at respectively opposite sides of the belt, so that their respective belt races will at all times be in proper alinement for belt travel from one to the other.

In the form shown in Fig. 1, the driving pulley is mounted on the shaft 15 of an engine or other power source 16. The pulley members 10 and 11 are carried by a spline sleeve 17 which has internal bushings 18 riding on a sleeve 19 that is held in place by lock nuts 20 and bears against the fixed hub 21 of a centrifugal clutch member 22 that coacts with a flange 23 on the member 12 for driving the pulleys. The belt pulley is thus idle on the shaft 15 until the latter has attained sufficient speed to cause the centrifugal clutch to engage.

The hub 24 of the pulley member 10 is fast on the spline sleeve 17 and the hub 25 of the axially movable member 11 is axially slidable on the spline sleeve 17. Outwardly beyond the hub 25 of the member 11 is the hub 26 of a bowl-shaped cam or ramp member 27 which is fast on the spline sleeve 17 and serves with a flange 28 of the axially shiftable member 11 as a housing for the mechanism which controls the movements of the shiftable member 11.

A plurality of arms 29 are pivotally mounted at 30 on brackets 31 secured to the pulley member 11, so as to swing in radial planes with respect to the axis of the pulley. These arms carry rollers 32 at their outer ends and may be additionally provided with supplement flyweights 33 so as to swing outward under centrifugal force, upon rotation of the pulley, causing the rollers 32 to coact with the cam surface of the ramp member 27 to force pulley member 11 toward the member 10, thus contracting the belt groove and increasing the effective diameter of the pulley. The radial curvature of the ramp member 27 is such that as the rollers are swung outward by centrifugal force acting on the arms 29 and the weights carried thereby, the component of force which urges the pulley member 11 against the sides of the belt 12 causes member 11 to move toward the member 10 more closely as the speed of rotation increases, but with progressively lessening side pressure on the belt, due to the overhanging radial curvature of the ramp. This curvature is shown schematically in the drawing, but in practice is determined mathematically or empirically to obtain the desired rate of change of ratio for any particular application.

A suitable structure for the centrifugally actuated elements is shown in detail in Figs. 2 and 3, in which structure the bracket members 31 are attached to the member 11 and each arm 29 comprises two side parts separated by and attached to the flyweight 33 and hinged to the bracket 31 by the pivot pin 30. The roller 32 is mounted on a pin 34 and the pins 30 and 34 are locked in place by cotters 35.

In the form shown in Figure 1, the members 13 and 14 of the driven pulley are carried on spline sleeve 36, upon which the hub 37 of member 14 is axially slidable and the hub 38 of the member 13 is fixed. A housing member 39 is also fixed on the spline sleeve 36 which in turn is fast on the driven shaft 40.

A circular ramp member 41 is fast on the hub of the member 14 and has a cam surface 42 that coacts with a roller 43 carried by an arm 44 swingably carried on a pin 45 on the member 39 and normally urged to swing toward the axis of the shaft 40. As shown in Figure 4, the arm 44 may be a wire bent to U-shape to form a pivot for the roller 43 and having its leg portions coiled to form helical twist springs 46 centered on the pin 45 and then forming end portions 47 extending along the surface of the member 39 and then bent at right angles to seat in perforations 48 in said member 39. The pin 45 is held in place by a clip 50 which embraces the middle portion of the pin 45, has one end interlocked at 51 in a perforation in the member 39 and has its opposite end fastened by a bolt 52.

The structure shown in Figure 7 is substantially like that of the driven pulley of Figure 1, except that the swinging arms 53 which carry the rollers 54 are in the form of bell-cranks urged inwardly by spring pressure, schematically indicated as tension springs 55.

In each of the forms of driven pulleys shown in Figures 1, 6, and 7 the position of the shiftable pulley member is controlled by pressure due to the pull on the belt acting against the spring pressure, plus the effect of the swinging arms in coacting relation to the cam-shaped ramp.

Fig. 6 shows the manner in which springs 46, arms 44 and rollers 43 cooperate with ramp 42 to obtain relatively large pressure against the sides of the belt when the driven pulley faces are close together, and decreased pressure against the sides of the belt as the pulley faces are forced apart by wedging action of the belt. The springs 46 cause rollers 43 to exert force $Fs$ upon the cam surface of ramp 42 in a direction perpendicular to the tangent of the face of the cam surface at the point of contact of the roller. When the pulley faces are close together, as indicated in the upper part of Figure 6, a large component of axial force $Fa$ and a very small component of radial force $Fr$ is exerted upon the cam by the rollers, the radial force having no effect since the cam cannot move in any radial direction. As the pulley faces are forced apart by wedging action of the belt, as indicated in the lower part of Fig. 6, the axial component of force $Fa$ is reduced, and the radial component $Fr$ is increased, the radial component again having no effect.

Figure 8:
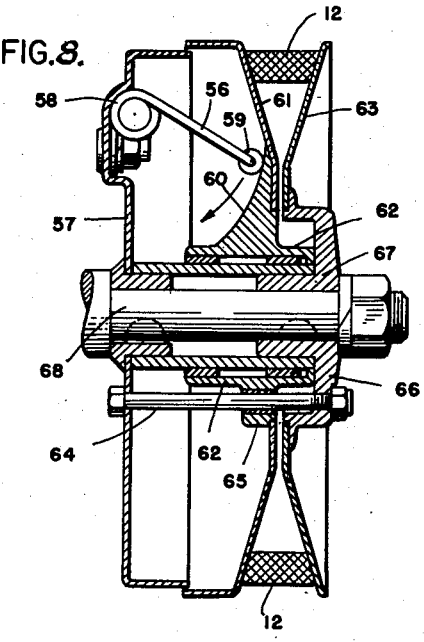
Fig. 8 is a sectional detail of a further modification of a driven pulley constructed according to this invention but utilizing the varying spring pressure in a somewhat different manner.

These same factors apply to the form of the invention which is shown in Figure 8 but in this case the swinging arms 56 are inclined inwardly toward the axis of the pulley and are mounted on the fixed third member 57 in such manner that the helically twisted springs 58 acting on the rollers 59 tend to swing the arms 56 outward against the cam ramp 60. The cam ramp 60 is so disposed and shaped that with yielding of the movable pulley disk 61 toward the left of Figure 8 under the wedging action of the belt 12, due to the pull on the belt the side pressure on the belt progressively decreases.

In this form, Fig. 8, instead of having an annular cam ramp in the form of a sheet metal plate attached to the shiftable pulley member, the cam ramp function is performed by a plurality of radial ribs 60 on the hub 62 of the shiftable member 61. Relative rotation of the member 61 with respect to the fixed member 63 of the pulley is prevented by one or more bolts 64 connecting lugs 65 with an annular flange 66 on the hub 67 of the fixed pulley member. It will be understood by those skilled in the art that in order to produce a balanced structure, there would be a number of arms 56, ramps 60 and bolts 64 arranged in self-balancing relation to each other around the axis of the shaft 68.

The operation of the present invention will be apparent from the foregoing description. The fundamental aim of the invention is the reduction of pressure on the sides of the belt as the transmission automatically shifts from high to low ratio when the speed of the driving member and the speed of the belt increase. The reduction of pressure against the sides of the V-belt as the drive shifts into low ratio changes the shifting characteristics somewhat. For this reason, after the shape of the cam, the spring pressure, and the disposition of the coacting elements in the driven member have been properly adjusted to obtain the desired belt pressure at all points within the operating range of the driven pulley members, then the cam and weights of the coacting elements of the driving pulley must be corrected to obtain the proper rate of change in the speed ratio between the pulleys.

In the case of the driven pulley, it is advantageous, according to the present invention, to reduce to a minimum the effect of centrifugal force on the pulley mechanism and to control the movement of the slidable member mainly by pull on the belt and the wedging effect produced thereby acting against the pressure exerted by the spring pressed arms. To this end the spring pressed arms are made light in weight in all forms and, in the form shown in Fig. 8, both the spring pressed arms 56 and the cam ramps 60 are disposed in such direction that axial component of combined spring pressure and centrifugal force that exerts pressure on the belt becomes progressively reduced as the slidable member 61 moves toward the left of Fig. 8.

Some modifications of the features of the present invention have been shown in the drawings, but it will be understood that numerous other details of the construction shown may be altered or omitted without departing from the spirit of the invention as defined by the following claims.

I claim:

1. A variable speed mechanism, comprising a driving pulley, a driven pulley, and a belt coactively connecting said pulleys, each of said pulleys comprising a pair of opposed conical members, one of which members of each pair being axially movable toward and away from the other to vary the speed ratio of the pulleys, pressure means for urging said movable members toward their mates to exert a driving pressure on the sides of said belt, said pressure means on the driving pulley comprising mechanism actuated by centrifugal force, and said pressure means on the driven pulley comprising swingingly mounted arms, cam means coacting with said arms to resist spreading of the said conical members, and spring means acting directly on said arms to urge them against the cam means, said cam means being curved so that the axial components of the pressure of said arms in the direction toward the movable pulley member will be progressively reduced as the effective diameter of the driven pulley is reduced.

2. A variable pitch pulley, comprising a shaft, a pair of opposed conical pulley members forming a V-shaped groove for a belt, one of said conical members being axially fixed on said shaft and the other being axially slidable thereon for varying the effective diameter of the pulley, a third member fixed on said shaft and spaced from said slidable member, an arm mounted on said third member to swing in a radial path with respect to the axis of said pulley and being inclined away from said third member toward the axis of said pulley, a spring normally urging said arm outward from said axis and against said slidable member, a cam surface movable with the slidable member of said pulley and coacting with said arm to control the pressure of the pulley members on the belt, said cam surface being curved radially in the region of its contact with said arm so that those components of the pressure of said arms against said cam ramp means which are directed axially toward the belt groove will be progressively of reduced amount according to increasing distance between the belt engaging surfaces of said pulley.

3. A variable pitch pulley, comprising a shaft, a pair of opposed conical pulley members forming a V-shaped groove for a belt, one of said conical members being axially fixed on said shaft and the other being axially slidable thereon for varying the effective diameter of the pulley, a third member fixed on said shaft and spaced from said slidable member, swingable arms carried by said third member, cam ramp means located between said axially slidable member and said arms, helical twist spring means urging said arms to bear against said cam ramp means so as to force same to urge said slidable conical member in a direction toward said fixed conical member, said cam ramp means being curved in a radial direction in the region of its contact with said arms so that those components of the pressure of said arms against said cam ramp means which are directed axially toward the belt groove will be of progressively reduced amount according to increasing distance between the belt engaging surfaces of said pulley.

CHARLES D. AMMON.

REFERENCES CITED

The following references are of record in the file of this patent:

UNITED STATES PATENTS

| Number | Name | Date |
| --- | --- | --- |
| 1,501,705 | Decoux | July 15, 1924 |
| 2,294,777 | Heyer | Sept. 1, 1942 |
| 2,378,549 | Gruenhagen | June 19, 1945 |
| 2,496,061 | Miner | Jan. 31, 1950 |
| 2,496,201 | Dodge | Jan. 31, 1950 |
| 2,497,544 | Gravina | Feb. 14, 1950 |

FOREIGN PATENTS

| Number | Country | Date |
| --- | --- | --- |
| 435,257 | Great Britain | Sept. 18, 1935 |